(12) United States Patent
Siegrist et al.

(10) Patent No.: US 9,825,693 B1
(45) Date of Patent: *Nov. 21, 2017

(54) METHOD AND APPARATUS FOR SYMBOL MEASUREMENT AND COMBINING

(71) Applicant: Northrop Grumman Systems Corporation, Falls Church, VA (US)

(72) Inventors: Scott Siegrist, Hermosa Beach, CA (US); John M. Trippett, Torrance, CA (US); Yenming Chen, Torrance, CA (US); Meina Xu, Temple City, CA (US); Christopher W. Walker, Rancho Palos Verdes, CA (US); Brandon Rigg, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 595 days.

This patent is subject to a terminal disclaimer.

(21) Appl. No.: 14/468,560

(22) Filed: Aug. 26, 2014

(51) Int. Cl.
*H04B 7/185* (2006.01)
*H04B 7/06* (2006.01)
*H04B 7/08* (2006.01)
*H04K 3/00* (2006.01)

(52) U.S. Cl.
CPC ....... *H04B 7/18513* (2013.01); *H04B 7/0617* (2013.01); *H04B 7/0854* (2013.01); *H04K 3/20* (2013.01); *H04K 2203/32* (2013.01)

(58) Field of Classification Search
CPC .............. H04B 7/18513; H04B 7/0617; H04B 7/0854; H04K 3/20; H04K 2203/32
See application file for complete search history.

(56) References Cited

U.S. PATENT DOCUMENTS

| 6,844,850 | B1 | 1/2005 | Lin | |
|---|---|---|---|---|
| 7,358,891 | B2 | 4/2008 | Struckman et al. | |
| 2002/0122002 | A1 | 9/2002 | Maalouf et al. | |
| 2008/0018533 | A1* | 1/2008 | Van Wechel | G01S 1/024 342/357.59 |
| 2011/0075601 | A1* | 3/2011 | Zheng | H04B 7/086 370/316 |

(Continued)

FOREIGN PATENT DOCUMENTS

WO      01/03330      1/2001

OTHER PUBLICATIONS

Monga, V. et al; Rank constrained ML estimation of structured covariance matrices with applications in radar target detection; Radar Conference (RADAR), 2012 IEEE; pp. 0475-0480; May 7-11, 2012.

(Continued)

*Primary Examiner* — Freshteh N Aghdam
(74) *Attorney, Agent, or Firm* — Patti & Malvone Law Group, LLC (57) ABSTRACT

A method and system of symbol measurement and combining (SMaC) provides near-optimal performance for each user independently by relying on rapid digital beamforming with near-ideal convergence properties. This approach is also provides near-ideal performance without any knowledge of user/jammer location and adapts instantly as those locations change. An iterative joint estimation method is used to determine a covariance matrix $R_{xx}$, and a user beamsteering vector, $\alpha$.

25 Claims, 5 Drawing Sheets

(56) References Cited

U.S. PATENT DOCUMENTS

2013/0044650 A1 2/2013 Barker et al.
2016/0073198 A1* 3/2016 Vilermo ............... H04R 5/027
381/26

OTHER PUBLICATIONS

El-Mahdy, A.E.; Partial band jamming of multicarrier frequency hopping/binary phase shift keying receiver over a rayleigh fading channel with imperfect channel estimation; Communications, IET; vol. 4, No. 3; pp. 285-294; Feb. 12, 2010; doi:10.1049/iet-com.2009.0382.
Hsieh, F. et al; Low Complexity Interference Rejection Combining for MLSE; Vehicular Technology Conference (VTC Spring); 2011 IEEE 73rd; Pagese 1-5; May 15-18, 2011.
Zhang, J. et al; An optimum diversity-combining technique for FFH/MFSK communication systems over frequency-selective fading channels with multitone jamming; Information, Communications and Signal Processing, 2009; ICICS 2009; 7th International Conference on, pp. 1-5; Dec. 8-10, 2009.

* cited by examiner

METHOD AND APPARATUS FOR SYMBOL MEASUREMENT AND COMBINING

STATEMENT OF GOVERNMENT RIGHTS

The Government of the United States of America has rights in this invention pursuant to Government Contract No. F04701-02-C-0002.

BACKGROUND

The invention relates generally to a method and system for digital beamforming in a multi-beam antenna system.

BACKGROUND

Satellite antenna systems are often used to provide communications between mobile ground-based terminals. Reliable communications between terminals is preferable to all users however, some applications have an especially critical need for robust operation. Military applications, for example, require a system that maintains communication between highly mobile terminals even in the presence of jamming signals and other sources of interference. Although jamming will be discussed below, the invention is equally applicable to any source of interference in a communication signal, intentional or unintentional.

In a communication environment with large jamming sources in the same receive bandwidth as the desired signal from a terminal, communication performance will be degraded significantly if anti-jamming measures are not employed. Numerous techniques have been proposed for dealing with this type of problem. Nulling approaches (Howells-Applebaum, U.S. Pat. No. 5,175,558 and U.S. Pat. No. 6,130,643) all attempt to preserve an overall pattern performance to all possible users, across the full system bandwidth, in the presence of jammer signals. An antenna with a nuller uses beamforming to constructively add signals from a desired source such as a mobile terminal, and cancel out the signals from a jamming or other undesired source. These approaches, however, are suboptimal.

Instead of nulling an interference source across all users, another architecture for the jamming problem is to optimize performance for each terminal independently against the jammer. Several approaches exist for optimizing performance to each user independently, for example, by means of beamforming with optimal combining (OC) and maximum ratio combining (MRC). These approaches suffer from either poor performance in the presence of jamming or interference, or require some knowledge of user and/or jammer location to be effective as further described by B. R. Tomiuk and N. Beaulieu, "A New Look at Maximal Ratio Combining", *Global Telecommunications Conference*, 2000, *GLOBECOM'00 IEEE*, vol. 2, pp. 943-948, November 2000. Without knowledge of the terminal/jammer locations, estimation techniques must be employed, however simple estimation techniques result in poor performance.

Thus, there exists a need for a satellite antenna system that combines optimized individual terminal beamforming with anti-jamming capabilities. There further exists a need for a method that optimizes for each user independently only over the user's receive bandwidth.

SUMMARY

A method and system of combining signals from multiple antennas provides near-optimal performance of maximizing the SNR for each user independently by relying on rapid digital beamforming with near-ideal convergence properties. This approach also provides near-ideal performance without any knowledge of user/jammer location and adapts instantly as those locations change. The limitations of previous approaches are overcome through an iterative joint estimation approach for determining the covariance matrix $R_{xx}$, and the user beamsteering vector, $\alpha$. Then, straightforward techniques are used to determine ideal weighting.

The invention in one implementation encompasses a method for digital beamforming the input signals from one or more antennas in a computer processor, including the steps of estimating an initial steering vector from the input signals from the one or more antennas, estimating an initial covariance matrix from the input signals using dynamic noise loading, generating a set of weights for the input signals from the one or more antennas from the initial steering vector and the initial covariance matrix, iteratively estimating a new weight for each beam until an optimum weight is achieved and applying the optimum weight to the input signals during digital beamforming.

The method further includes the steps of estimating an initial steering vector by processing each input signal statistically to generate symbols representing each input signal, partitioning the symbols into blocks and determining an estimated alpha value for each block.

The invention in another implementation further encompasses a method, executed in a computer processor, for digital beamforming the beams from a frequency hopped multi-beam antenna.

The invention in another implementation encompasses an apparatus including a multi-beam antenna system for performing digital beamforming of the input signals from one or more antenna elements.

The invention in yet another implementation encompasses a computer processor configured to perform a method for digital beamforming the input signals from one or more elements of multi-beam antenna.

DESCRIPTION OF THE DRAWINGS

Features of example implementations of the invention will become apparent from the description, the claims, and the accompanying drawings in which:

DETAILED DESCRIPTION

In general, beamforming combines signals from an array of antennas to transmit and receive directional signals using the principles of constructive and destructive interference. Signals detected by each antenna in the array are phased, or weighted, by varying amounts so as to transmit or receive a desired signal from a terminal. This approach is a method for received digital beamforming using a unique algorithm that overcomes the shortfalls of Optimal Combining (OC) methodology which uses a frequency hopped system as the target environment. A frequency-hopped system transmits signals by rapidly switching between different frequency channels. This approach is capable of operating in scenarios including both an AWGN (Additive White Gaussian Noise) and an AWGN with jamming environment. Additionally, this approach can also be used in the presence of non-hostile interference such as that which often occurs in a crowded telecommunications environment.

In an embodiment, the inventive method operates on symbols of a Symmetric Differential Phased Shift Keying (SDPSK) waveform received as part of signals, or beams, received from a plurality of antennas. A symbol is typically described as a pulse representing an integer number of bits. In an embodiment illustrating this method with a Multi-Beam Antenna (MBA) with $N_{beam}$ beams, the input signal is represented by X given by Equation (1) as the channel model with the received symbols of length N for all beams per hop (a hop consists of N symbols) under the stressed environment, $$X = \begin{bmatrix} \underline{x}_1 \\ \vdots \\ \underline{x}_{N_{beam}} \end{bmatrix} = \begin{bmatrix} x_{1,1} & \cdots & x_{N,1} \\ \vdots & \ddots & \vdots \\ x_{1,N_{beam}} & \cdots & x_{N,N_{beam}} \end{bmatrix} = \begin{bmatrix} \alpha_1 \underline{s} + \beta_1 \underline{J} + \underline{n}_1 \\ \vdots \\ \alpha_{N_{beam}} \underline{s} + \beta_{N_{beam}} \underline{J} + \underline{n}_{N_{beam}} \end{bmatrix} \quad (1)$$

where $$\underline{\alpha} = \begin{bmatrix} \alpha_1 \\ \vdots \\ \alpha_{N_{beam}} \end{bmatrix},$$

and $$\underline{\beta} = \begin{bmatrix} \beta_1 \\ \vdots \\ \beta_{N_{beam}} \end{bmatrix}$$

are the signal beam steering vector and jammer steering vector respectively, $\underline{s}$ is the transmitted modulated sequence of length N, $\underline{J}$ is the jammer vector of length N, and $\underline{n}_i$ is the AWGN vector of length N for beam i. The beam steering vector, $\underline{\alpha}$, indicates relative differences between the plurality of antennas receiving a signal. Likewise, each antenna experiences the jamming signal from a slightly different angle, resulting in the jammer steering vector, $\underline{\beta}$. The covariance matrix $R_{XX}$ is given by $$R_{xx} = E[XX^H] = \underbrace{\underline{\alpha}\underline{\alpha}^H}_{R_{ss}} + \underbrace{\sigma_j^2 \underline{\beta}\underline{\beta}^H + \sigma_n^2 I}_{R_{nn}},$$

where $R_{ss}$ is the signal covariance matrix containing the signal of interest, $R_{nn}$ is the noise covariance matrix containing both the jammer signal and AWGN.

Digital beamforming involves applying a weight to the signal received from each antenna to arrive at a coherent result when the beams are combined. While there are several prior art methods of determining weights when beamforming in an unstressed communication environment, the Maximum Ratio Combining (MRC) receiver achieves the best results, with a weight vector given by $$\underline{w}_{MRC} = \sqrt{SNR} \, e^{-j\underline{\theta}_\alpha}. \quad (2)$$

where $\underline{\theta}_\alpha$ is the angle of arrival of the steering vector. Likewise, when operating in a stressed environment, Optimal Combining (OC) is an optimal receiver whose weight vector for the digital beamformer is $$\underline{w}_{oc} = R_{XX}^{-1} \underline{\alpha} \quad (3)$$

or $$\underline{w}_{oc} = R_{nn}^{-1} \underline{\alpha} \quad (4)$$

where $R_{XX}$ is the covariance matrix of the received symbols, $\underline{\alpha}$ is the steering vector of the desired received signal without noise or jamming interference, $R_{nn}$ is the noise covariance matrix without the presence of signal. Therefore, $R_{XX}^{-1}\underline{\alpha} = cR_{nn}^{-1}\underline{\alpha}$ where c is a constant and multiplying the weights by a constant will not affect the decision space. Use of these equations requires that both the antenna configuration and the location of a desired signal are known in advance or are estimated. The weights are then applied to the received symbols in Equation (1) producing beamformed output, $\underline{\gamma}$ $$\underline{\gamma} = \underline{w}_{oc}^H X. \quad (5)$$

In a preferred embodiment, the inventive method improves on these methods because it works in a system in which neither the antenna configuration nor the terminal location and jammer location are known in advance. In general, locations and other parameters are not known, and must be estimated. Direct calculations of $R_{XX}$ and standard estimation techniques of $\underline{\alpha}$ result in extremely poor performance in the presence of strong power jammer; this observation is in the prior art literature without any methods provided for overcoming this problem. Instead, in a preferred embodiment, this approach works by using estimates for $R_{XX}$ and $\underline{\alpha}$ that are refined jointly by an iterative substitution method. The initial estimate for $R_{XX}$ is a direct calculation with dynamic noise loading based on the statistical characteristics of the received symbols to control the range of the norm of $R_{XX}^{-1}$. The initial estimate for $\underline{\alpha}$ is a combined maximum likelihood estimation and symbol quality evaluation across the received symbols. This method uses information only from the received symbols on a per hop basis on each of the different antenna feeds. The formed beam is optimized at each frequency based on the received symbols for each user. This method does not use any a priori spatial signal information or any history of received symbols.

In general, this method is a Substitution OC method with Dynamic Noise Loading (DNL). It consists of two major building blocks, Maximum Likelihood (ML) Alpha Estimator with Symbol Quality Estimator (SQE) and Substitution OC Method with Dynamic Noise Loading (DNL), shown in FIG. 1. The details of these building blocks are detailed in the following sections.

Figure 1:
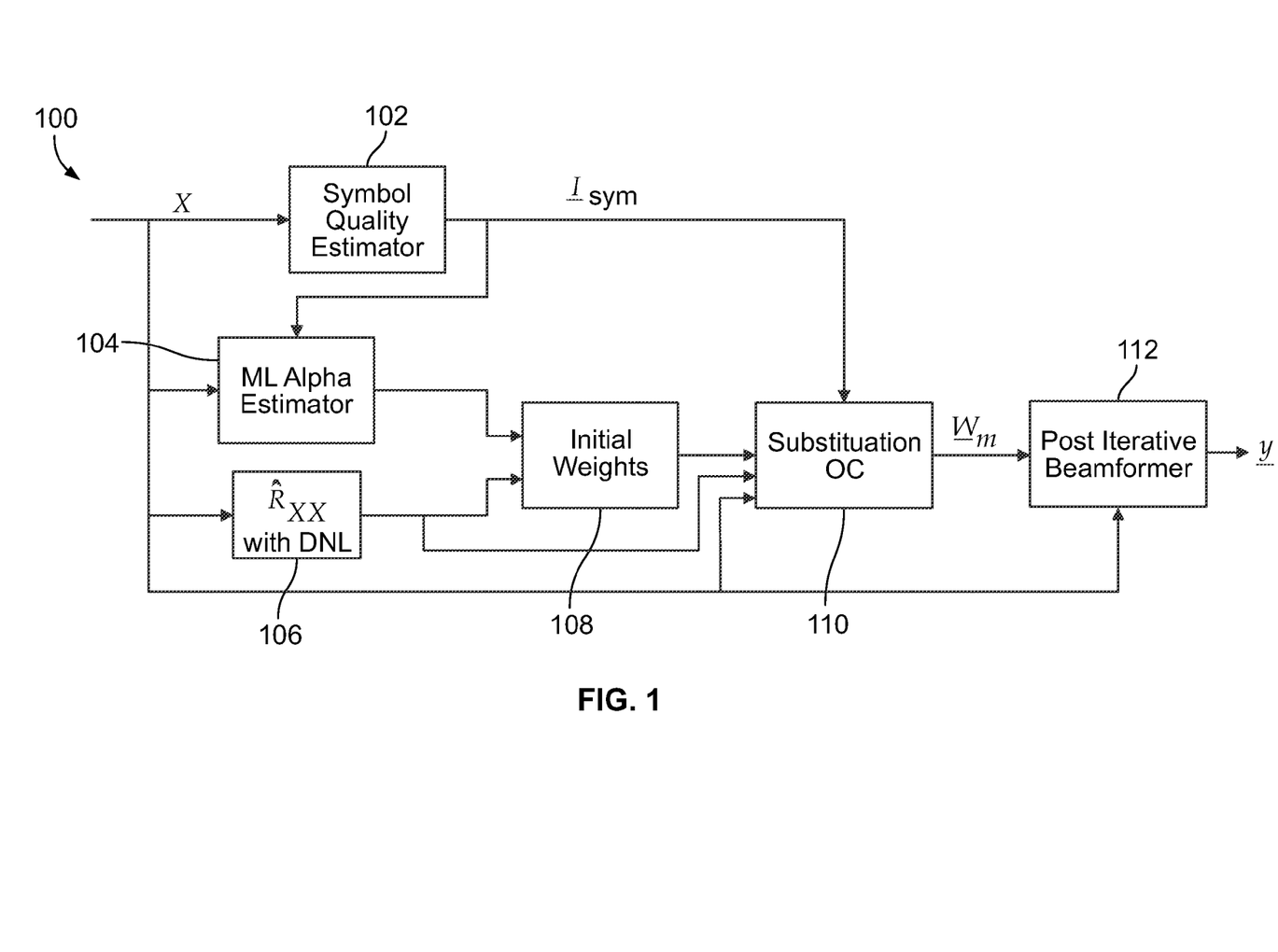
FIG. 1 is a representation of an apparatus for performing a method of digital beamforming.

Turning to FIG. 1, this method is performed by an apparatus 100 having a number of components. Incoming symbols X are received by Symbol Quality Estimator (SQE) 102, ML Alpha Estimator 104 and $R_{XX}$ with Dynamic Noise Loading (DNL) generator 106. The estimated values for $\underline{\alpha}$ and $R_{XX}$ are sent to initial weights generator 108. SQE 102 filters noise and power spikes from the received symbols X to generate a good symbol indicator stream, $\underline{I}_{sym}$. The output of initial weights generator 108 and $\underline{I}_{sym}$ are sent to Substitution OC generator 110 which iteratively produces a weight vector, $\underline{w}_m$. This output is used by Post Iterative Beamformer 112 to generate an output beam for each mobile terminal as will be explained below. The components of FIG. 1 in a preferred embodiment would comprise FPGA (field programmable gate array) or ASIC (application-specific integrated circuit) but any type of circuitry could be used.

Maximum Likelihood (ML) Alpha Estimator

Figure 2:
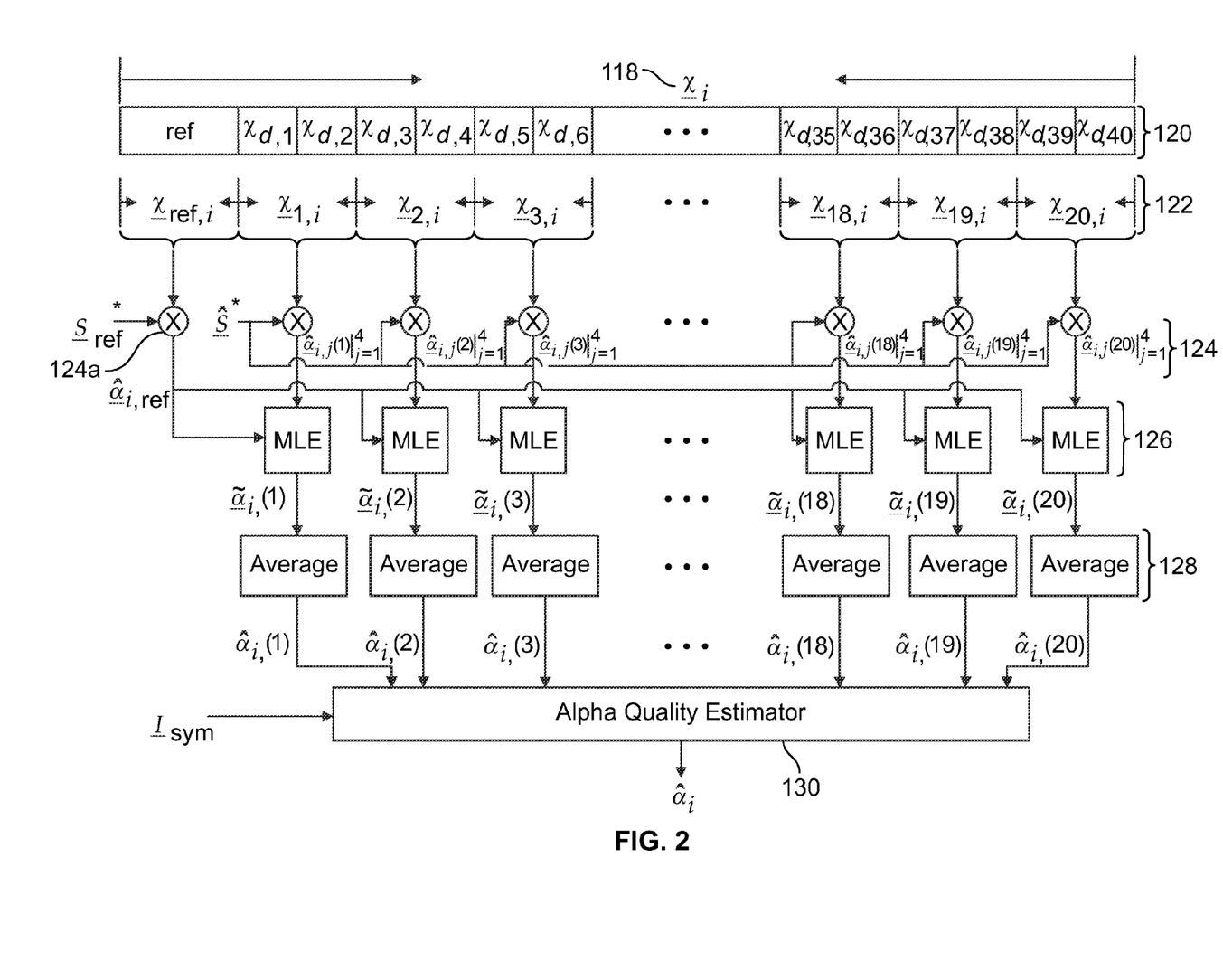
FIG. 2 is a representation of the ML Alpha Estimator of FIG. 1.

The beam steering vector, $\underline{\alpha}$, for a desired signal is calculated by ML Alpha Estimator 104 of FIG. 1. An example of the ML alpha estimator showing SDPSK 2+40 mode (a mode with 2 reference symbols and 40 data symbols) is shown in FIG. 2. Reference numeral 118 indicates complex received symbols $\underline{x}_i$ of a hop for beam i, $$\underline{x}_i = [x_{1,i}, \ldots, x_{N,i}],$$

where $N = N_{ref} + N_{data}$, $N_{ref}$ is the number of reference symbols and $N_{data}$ is the number of data symbols. The sequence of received symbols $\underline{x}_i$ 118 is a vector of X for beam i in equation (1) and FIG. 1.

In order to reduce the complexity of calculating an estimate value for $\underline{\alpha}$, the data portion of the received symbols is partitioned into blocks 120 of length $N_p$ symbols, as illustrated in FIG. 2, where $N_p = 2$ is the length of the partitioned sequence in equation (6), $$\underline{x}_i = \left[\underline{x}_{ref,i}, \underbrace{\underline{x}_{data,i}}_{\{\underline{x}_{k,i}\}_{k=1}^{N_{data}/2}}\right] = [\underline{x}_{ref,i}, \underline{x}_{1,i}, \ldots, \underline{x}_{N_{data}/2,i}], \quad (6)$$

where $\underline{x}_{k,i}$, $k \in \{1, \ldots, N_{data}/2\}$ is a length-$N_p$ or length-2 sequence for partitioned sequence k and beam i. For SDPSK modulation, the four possible symbol constellations are $$\{1, e^{j\frac{\pi}{2}}, -1, e^{-j\frac{\pi}{2}}\}.$$

Assuming the starting symbol constellation of the SDPSK modulation is at 1, there are $2^{N_p}$ or 4 pairs of the possible transmitted sequence, $$\hat{\underline{s}} = \{[1 \ e^{j\frac{\pi}{2}}], [1 \ e^{-j\frac{\pi}{2}}], [-1 \ e^{j\frac{\pi}{2}}], [-1 \ e^{-j\frac{\pi}{2}}]\},$$

for each partitioned sequence. At 124, the partitioned sequence is correlated with each pair of the estimated symbols, $\hat{\underline{s}}$, which provides a set of alpha estimates of the partitioned sequence.

Correlators 124 output the alpha estimates of each partitioned sequence as shown in equation (7):

$$\hat{\underline{\alpha}}_{i,j}(k) = \underline{x}_{k,i} \begin{bmatrix} \hat{s}_j(1)^* & \cdots & 0 \\ \vdots & \ddots & \vdots \\ 0 & \cdots & \hat{s}_j(N_p)^* \end{bmatrix}, \quad (7)$$

where $k=1, \ldots, N_{data}/2$, $j=1, \ldots, 2^{N_p}$, i is the beam number, $N_p = 2$, and $$\hat{\underline{s}} = \{\hat{s}_j|_{j=1}^4\}.$$

Given the known transmitted reference symbols $\underline{s}_{ref} = [s_{ref}(1), \ldots, s_{ref}(N_{ref})]$ of length $N_{ref}$, the alpha estimate for the received reference sequence is output from correlator 124a as $$\hat{\underline{\alpha}}_{i,ref} = \underline{x}_{ref,i} \begin{bmatrix} s_{ref}(1)^* & \cdots & 0 \\ \vdots & \ddots & \vdots \\ 0 & \cdots & s_{ref}(N_{ref})^* \end{bmatrix}. \quad (8)$$

A decision metric is calculated by MLEs 126 using equation (9):

$$d_{i,j}(k) = \text{sum}[\hat{\underline{\alpha}}_{i,ref}, \hat{\underline{\alpha}}_{i,j}(k)] = \hat{\underline{\alpha}}_{i,ref}\underline{I}_{N_{ref}}^t + \hat{\underline{\alpha}}_{i,j}(k)\underline{I}_{N_p}^t, \text{ for } j=1, \ldots, 2^{N_p}, \quad (9)$$

where $$\underline{I}_{N_{ref}} = [\underbrace{1 \ \cdots \ 1}_{N_{ref} \text{ times}}],$$

$$\underline{I}_{N_p} = [\underbrace{1 \ \cdots \ 1}_{N_p \text{ times}}],$$

and perform ML alpha estimate by choosing the top 3 sums, $d_{i,j}(k)|_{j=(1),(2),(3)}$, where $j=(1),(2),(3)$ represent the indices of the 3 possible transmitted sequences that yield the top 3 sum $d_{i,j}(k)$ for a given partitioned sequence k and beam i. Keeping the top three alpha estimates out of 4 from the decision metric $d_{i,j}(k)|_{j=1}^4$ maximizes the likelihood of good alpha estimate in the presence of jammers. Then each of the top 3 decision metrics are scaled to get the top 3 alpha estimates of the partitioned sequence which are output by MLEs 126 as given by equation (10):

$$\tilde{\alpha}_i(k) = \tilde{\alpha}_{i,j}(k)|_{j=(1),(2),(3)} = \frac{1}{(N_{ref} + N_p)} d_{i,j}(k)\bigg|_{j=(1),(2),(3)}, \quad (10)$$

where $N_p$ is the length of the partitioned sequence. Next, the linear average of the top three alpha estimates of the partitioned sequence is determined to be the alpha estimate for the partitioned sequence k as shown by equation (11):

$$\hat{\alpha}_i(k) = \frac{1}{3}\sum_j \tilde{\alpha}_i(k)\bigg|_{j=(1),(2),(3)} \quad (11)$$

The ML alpha estimation operation is repeated for all k and beam i. The alpha estimate for beam i is the output of the Alpha Quality Estimator (AQE) 130, that takes the alpha estimator for the partitioned sequence, $$\hat{\alpha}_i(k)|_{k=1}^{\frac{N_{data}}{N_p}},$$

and the Symbol Quality Estimator (SQE) 102 output, $\underline{I}_{sym}$, as shown in Equation (16) discussed below, with the output $$\hat{\alpha}_i = AQE\left(\hat{\alpha}_i(k)|_{k=1}^{\frac{N_{data}}{N_p}}, \underline{I}_{sym}\right) \quad (12)$$

The alpha estimate for beam i is calculated according to Equation (18) shown below. An example of the ML alpha estimate showing SDPSK 2+40 mode for a given beam i is shown in FIG. 2, where the MLEs 126 perform the following as described above:

$$d_{i,j}(k)|_{j=1}^4 = \hat{\underline{\alpha}}_{i,ref} + \hat{\underline{\alpha}}_{i,j}(k)|_{j=1}^4, k=1,\ldots,20$$

$$d_{i,j}(k)|_{j=(1),(2),(3)} = \text{top 3 of the set } d_{i,j}(k)|_{j=1}^4,$$

$$\tilde{\underline{\alpha}}_i(k) = \frac{1}{N_{ref}+N_p} d_{i,j}(k)\bigg|_{j=(1),(2),(3)}, k=1,\ldots,20$$

Symbol Quality Estimator

Figure 3:
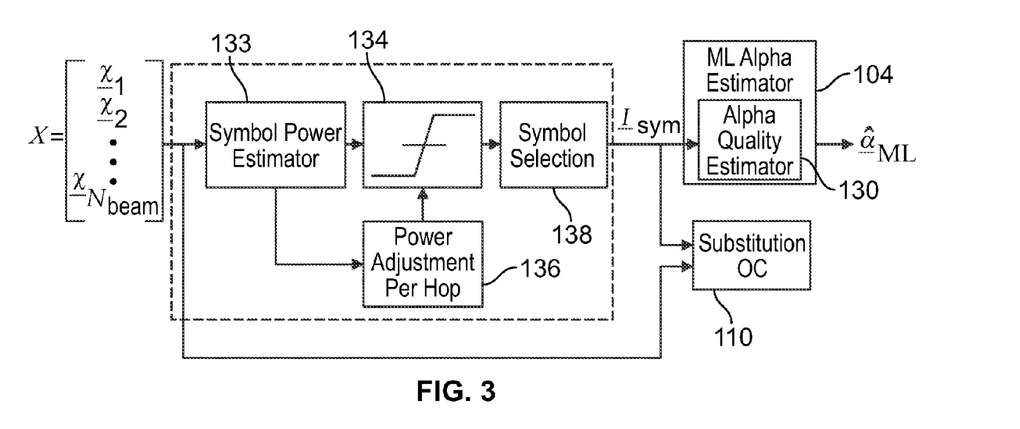
FIG. 3 is a representation of the Signal Quality Estimator of FIG. 1.

Symbol Quality Estimator 102 of FIG. 1 is shown in more detail in FIG. 3. SQE 102 is a statistical estimator used to detect jammed symbols for high quality symbols estimation. It uses the statistics of the received symbol power to eliminate severely jammed symbols or outliers thus preserving high quality symbols for this beam-combining processing. The estimator takes symbol power measurement in each hop, computes the statistics of the symbol power measurement, sets up a threshold dynamically in each hop, and compares it with the symbol power measurement to determine outliers, as shown in FIG. 3. High quality symbols are then preserved in each hop for each beam and symbol selection is done in a statistical manner such that high quality symbols over all beams are compared for a high confidence symbol selection.

An abnormally high power of a received symbol can indicate either a momentary blip or the presence of a jamming signal. The power adjustment is done on a per hop basis by element 136. For each beam i, the apparatus of FIG. 3 finds the median of the symbol power per hop in element 133, and computes a threshold power by element 136 according to equation (13)

$$\sigma_{r,i,th}^2 = \text{med}(\text{abs}(\underline{x}_i^2)) + \gamma \text{ std}(\text{abs}(\underline{x}_i^2)), \quad (13)$$

where γ is a constant. An alternate approach for calculating the threshold for beam i is $$\sigma_{r,i,th}^2 = E[\underline{p}_{x_i}(l_{80}:l_{97})],$$

where $$\underline{p}_{x_i} = \text{sort}(\text{abs}(\underline{x}_i)),$$

$l_{80} = \lceil 0.8 \cdot N \rceil$, $l_{97} = \lceil 0.97 \cdot N \rceil$.

The symbol power estimate output by element 133 is compared with the threshold power calculated by element 136. Symbols per beam are chosen by element 134 as shown in equation (14):

$$I_i(\sigma_{r(l),i}^2) = \begin{cases} 1, & \sigma_{r(l),i}^2 < \sigma_{r,i,th}^2 \\ 0, & \sigma_{r(l),i}^2 \geq \sigma_{r,i,th}^2 \end{cases} \quad (14)$$

for $l=1,\ldots,N$ where $N=N_{ref}+N_{data}$ and for beam i, where $\sigma_{r(l),i}^2 = |x_i(l)^2|$ is the symbol power estimate output by element 133.

The symbol selection in element 138 is based on the estimated high quality symbols for all beams and makes a majority rule decision as $$I(\sigma_{r(l)}^2) = \begin{cases} 0, & \frac{1}{N_{beam}} \sum_{i=1}^{N_{beam}} I_i(\sigma_{r(l),i}^2) < 0.5 \\ 1, & \frac{1}{N_{beam}} \sum_{i=1}^{N_{beam}} I_i(\sigma_{r(l),i}^2) \geq 0.5 \end{cases}, \text{for } l=1,\ldots,N. \quad (15)$$

To ensure that reference symbols are chosen, the symbol selection in element 138 is updated as $$I_{sym}(l) = \begin{cases} 1, & l \in \{1,\ldots,N_{ref}\} \\ I(\sigma_{r(l)}^2), & l \in \{N_{ref}+1,\ldots,N\} \end{cases}, \text{for all beams}, \quad (16)$$

where a symbol number l is selected when the indicator function $I_{sym}(l)=1$. AQE 130 of FIG. 2 receives the symbol selection as a input and selects a high quality alpha estimate as $$I_\alpha(k) = \begin{cases} 1, & I_{sym}(l_{odd}+N_{ref})I_{sym}(l_{odd}+N_{ref}+1) = 1 \\ 0, & I_{sym}(l_{odd}+N_{ref})I_{sym}(l_{odd}+N_{ref}+1) = 0 \end{cases}, \quad (17)$$

where $$k = \frac{l_{odd}+1}{N_p}, k \in \left\{1,2,\ldots,\frac{N_{data}}{N_p}\right\}$$

for $$l_{odd} \in \{1,3,\ldots,N_{data}-1\}$$

The alpha estimator indicator function in Equation (17) shows that alpha estimator number k is selected when $I_\alpha(k)=1$ where the alpha estimator $\hat{\alpha}_i(k)$ is given in Equation (11) for $$k \in \left\{1,\ldots,\frac{N_{data}}{N_p}\right\}.$$

The alpha estimator for beam i with AQE 130 of FIG. 2 is updated from Equation (12) to be $$\hat{\alpha}_i = \frac{1}{\sum_k I_\alpha(k)} \sum_{k=1}^{\frac{N_{data}}{N_p}} I_\alpha(k)\hat{\alpha}_i(k) \quad (18)$$

The ML alpha estimator is therefore $$\hat{\underline{\alpha}}_{ML} = \hat{\alpha}_i \mid_{i=1}^{N_{beam}} = \begin{bmatrix} \hat{\alpha}_1 \\ \hat{\alpha}_2 \\ \vdots \\ \hat{\alpha}_{N_{beam}} \end{bmatrix}. \qquad (19)$$

Substitution OC

Figure 4:
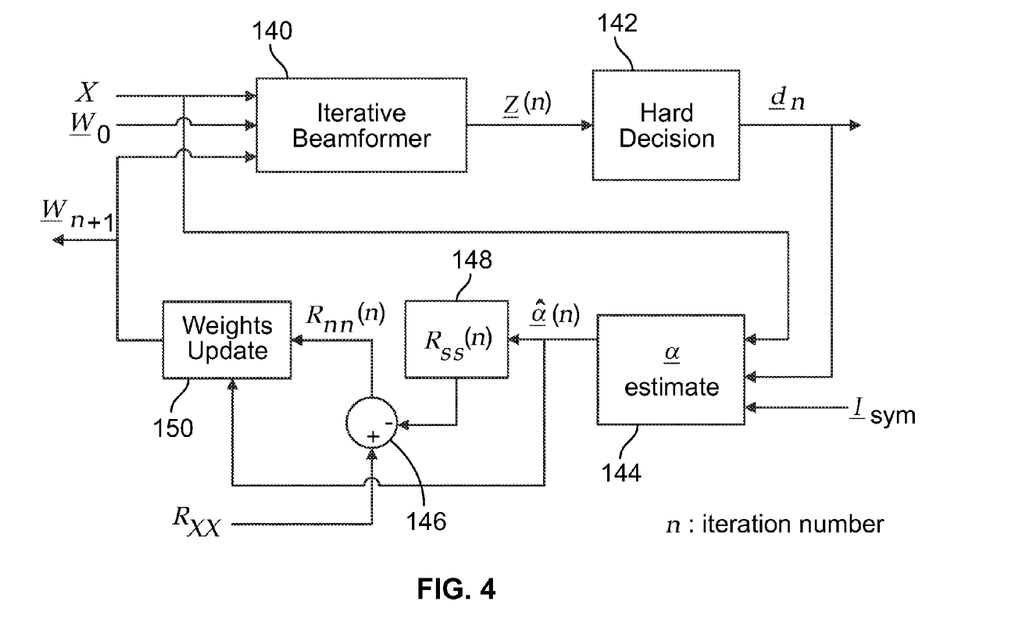
FIG. 4 is a representation of a Substitution OC processor of FIG. 1.

Substitution OC element 110 of FIG. 1 is shown in more detail in FIG. 4. As shown in FIG. 4, the Substitution OC method is iterative with good initial weights such that an optimal set of weights is determined within a few iterations. The direct substitution method is utilized such that given an initial weight vector $\underline{w}_0$, the iteration is $$\underline{w}_{n+1} = f(\underline{w}_n), \text{ for } n \geq 0. \qquad (20)$$

To ensure that the Substitution OC method converges to a near optimal solution, a good starting set of weights is required. The ML Alpha Estimator 104 and SQE 102 of FIG. 1 determine the alpha estimates that are good matches for the covariance matrix $\hat{R}_{XX}$ by element 106 of FIG. 1, producing a good initial OC weight vector.

The initial weights without noise loading are calculated according to equation (21)

$$\underline{w}_0 \text{ (no noise loading)} = \hat{R}_{XX}^{-1} \hat{\underline{\alpha}}_{ML}, \qquad (21)$$

where the covariance matrix 106

$$\hat{R}_{XX} = \frac{1}{N} X X^H$$

of FIG. 1 is determined from the received symbols X in equation (1) using a Hermitian matrix of X and $\hat{\underline{\alpha}}_{ML}$ is obtained from Equation (19) for all beams. Since the diagonal elements of the covariance matrix are not well-conditioned due to jammers, inverting the matrix would have both large and small eigenvalues, making the weights in (21) very sensitive to errors in $\hat{\underline{\alpha}}_{ML}$. Diagonal noise loading is used on the covariance matrix to alleviate this issue since diagonal noise loading prevents eigenvalues that are too small.

The dynamic noise loading is done on the diagonal elements of the covariance matrix $\hat{R}_{XX}$ as shown by element 106 of FIG. 1 at every hop. The minimum of the diagonal elements of the covariance matrix is calculated, the standard deviation of the diagonal elements is determined, and the noise loading is found to be $$nl = c_{nl} \frac{\min(\text{diag}(\hat{R}_{XX}))}{\text{std}(\text{diag}(\hat{R}_{XX}))}, \qquad (22)$$

where $c_{nl}$ is a constant. The updated covariance matrix 106 of FIG. 1 is then given be equation (23):

$$R_{XX} = \hat{R}_{XX} + nl\,I, \qquad (23)$$

where I is a $N_{beam} \times N_{beam}$ identity matrix scaled by noise loading factor nl and $N_{beam}$ is the number of beams. Given the estimated covariance matrix with DNL, and the ML alpha estimate, $\hat{\underline{\alpha}}_{ML}$, the initial estimate of weights 108 of FIG. 1 is calculated using optimal combining $$\underline{w}_0 = R_{XX}^{-1} \hat{\underline{\alpha}}_{ML}. \qquad (24)$$

A good initial set of weights calculated using ML alpha estimate and covariance matrix with DNL, are used for the iterative Substitution OC Method which further refines the weights for SNR optimization.

The Substitution OC Method 110 of FIG. 1 is an iterative method that, with good initial weights from Equation (24), will converge to a unique and near-optimal solution for beamformer weights in a few iterations. As shown in FIG. 4, where the $\underline{\alpha}$ estimate and weights are updated every iteration, $\underline{I}_{sym}$ is a vector of the indicator function (16) that comes from the SQE 102 of FIG. 1. Initial weights $\underline{w}_0$ are input to Iterative Beamformer 140 which uses weights $\underline{w}_n$ for subsequent iterations to output $\underline{z}(n)$ according to equation (30) below. Hard Decision logic 142 calculates $\underline{d}_n$ in accordance with equations (28) and (29) below. The result, together with input symbols X and the high quality indicator vector $\underline{I}_{sym}$ are input into the $\underline{\alpha}$ estimator 144 which determines $\hat{\underline{\alpha}}(n)$ in accordance with equation (25) which further refines the estimate in each iteration. Logic 144 provides an input to logic 148 which calculates the signal covariance matrix $R_{ss}(n)$ in accordance with equation (31). This result is added to $R_{XX}$ in adder 146 then provided to weights update logic 150, which executes equation (26). Assuming $\underline{d}(t)$ is uncorrelated with $\underline{J}(t)$ and $\underline{n}(t)$, then the $\underline{\alpha}$ estimator 144 is shown to make the method converge as long as the Symbol Error (SE)<0.5 according to equation (25):

$$\hat{\underline{\alpha}} = \mathbb{E}\,[\underline{d}(t)^H \underline{x}(t)] = \underline{\alpha}(1 - 2SE). \qquad (25)$$

Assuming the transmitted reference symbols $\underline{s}_{ref}$ are known, for SDPSK waveforms, for each iteration n = 1, ..., m, the method uses refined estimates of $\hat{\underline{\alpha}}$, $R_{ss}$ and $R_{nn}$ to update the weights as $$\underline{w}_{n+1} = g(R_{ss}(n), R_{nn}(n), \hat{\underline{\alpha}}(n), \underline{w}_n) = R_{nn}(n)^{-1} \hat{\underline{\alpha}}(n), \qquad (26)$$

where $$\hat{\underline{\alpha}}(n) = \frac{1}{\underline{I}_{sym} \underline{I}^t} \left[ X(:, \underline{I}_{sym}) \underline{d}(:, \underline{I}_{sym})_n^H \right], \qquad (27)$$

$$\underline{I} = [1, \ldots, 1]_{1 \times N},$$

$$\underline{d}_n = [\underline{s}_{ref}, \underline{d}_{data}(n)], \qquad (28)$$

$$\underline{d}_{data}(n) = \begin{cases} \text{sgn}[\text{Re}(z_k(n))], k \text{ odd}, & k \geq N_{ref} + 1 \\ i\,\text{sgn}[\text{Im}(z_k(n))], k \text{ even}, & k \geq N_{ref} + 1 \end{cases}, \qquad (29)$$

$$\text{sgn}(u) = \begin{cases} -1, & u < 0 \\ 1, & u \geq 0 \end{cases},$$

$$\underline{z}(n) = [z_1, \ldots, z_N](n) = \begin{cases} \underline{w}_0^H X, & n = 1 \\ \underline{w}_n^H X, & n = 2, \ldots, m \end{cases}, \qquad (30)$$

$$R_{ss}(n) = \hat{\underline{\alpha}}(n) \hat{\underline{\alpha}}(n)^H, \qquad (31)$$

$$R_{nn}(n) = R_{XX} R_{ss}(n), \qquad (32)$$

where X is a $N_{beam} \times N$ matrix of the received samples and n is the iteration number. At the end of iteration m, the weights are normalized by the maximum of the weights magnitude.

The iterative method refines the $\underline{\alpha}$ estimate, $R_{nn}$, thus the beam-combining weights every iteration, converging to a set of optimal weights for a given user while maintaining implementable HW complexity.

Post Iterative Beamformer

Post Iterative Beamformer 112 of FIG. 1 uses the results of the iterative substitution method with beam combining weights optimized for each user in theater $$\underline{y} = \sum_{i=1}^{N_{beam}} w_i^* \underline{x}_i, \tag{33}$$

where $N_{beam}$ is the number of beams, $\underline{x}_j$ is the row vector from beam i of X, $w^*_i$ is the beam combining weight for a given hop and $\underline{y}$ is the combined beam. Moreover, $\underline{w}_m = [w_1, \ldots, w_{Nbeam}]^1$ is the weight vector from the Substitution OC method. The beamformer combines the received symbols with adaptive weights that optimize the user SNR while the impacts of jammer and interference are minimized at the same time. The beamformed output signal $\underline{y}$ is clear of jammer impacts and can be demodulated easily.

Figure 5:
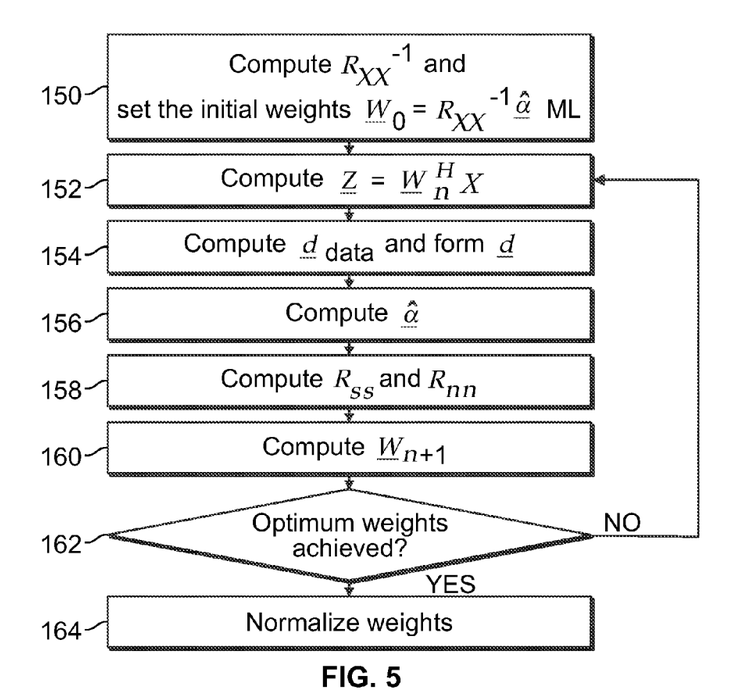
FIG. 5 is a flowchart of a method for digital beamforming using Substitution Optimal Combining.

An implementation of the invention according to a preferred embodiment is shown in FIG. 5. At step 150, $R_{XX}^{-1}$ is computed, where $R_{XX}$ is found according to equation (23), and estimated alpha $\hat{\underline{\alpha}}_{ML}$ is computed according to equation (19), then the initial weight is set according to $\underline{w}_0 = R_{XX}^{-1} \hat{\underline{\alpha}}_{ML}$ in equation (24).

Then, beginning with step 152, a set of m iterations per hop is started, and for each iteration, a series of steps are performed. In a preferred embodiment, 3 iterations give an optimal result, but any number of iterations may be used. The device may also detect an end condition instead of being set to a certain number of iterations.

At step 152, the demodulation $\underline{z} = \underline{w}_n^H X$ is computed, where X is a $N_{beam} \times N$ matrix of the received samples and $\underline{w}_n = \underline{w}_0$ for n=1.

At step 154, two decision metrics:

$$\underline{d}_{data}(n) = \begin{cases} \text{sgn}[\text{Re}(z_k(n))], & k \text{ odd}, \quad k \geq N_{ref} + 1 \\ i\,\text{sgn}[\text{Im}(z_k(n))], & k \text{ even}, \quad k \geq N_{ref} + 1 \end{cases}$$

and $\underline{d} = [\underline{s}_{ref}, \underline{d}_{data}]$ are formed where $\underline{s}_{ref}$ is a sequence of known reference symbols.

At step 156, an estimated alpha is computed according to $$\hat{\underline{\alpha}}(n) = \frac{1}{I_{sym} \underline{I}^T} X(:, I_{sym}) \underline{d}(:, I_{sym})^H,$$

where $\underline{I} = [1, \ldots, 1]_{1 \times N}$.

At step 158, values for $R_{ss}$ and $R_{nn}$ are computed in accordance with $R_{ss} = \hat{\underline{\alpha}} \hat{\underline{\alpha}}^H$ and $R_{nn} = R_{XX} - R_{ss}$.

Then, in step 160, a weight vector is computed according to $\underline{w}_{n+1} = R_{nn}^{-1} \underline{\alpha}$.

At decision point 162, an end condition for the iterations is checked and, it not met, the process returns to step 152. Otherwise, the process continues to step 162 where the weights are normalized by the maximum of the weights magnitude.

In a preferred embodiment, this approach is developed based on the SDPSK modes of 2+40, 4+80, and 8+160 (number of reference symbols+number of data symbols). It not only performs well under the stressed environment against the full-band noise jammer, partial band jammer, tone jammer and pulse jammer, the performance is near ideal MRC under unstressed environment due to the use of dynamic noise loading. The method is robust in both stressed and unstressed communications.

In an alternative embodiment, a different method is used in place of the Substitution OC method. Instead, a Substitution-SNR method is used to update beamformer weights.

Similarly to the Substitution—OC method, the Substitution—SNR method is a Contraction Mapping type and it has the same iteration implementation with the exception of the weights update. The weights update is done using the SNR equation (34)

$$\underline{w}_{n+1} = \frac{\underline{w}_n^H R_{nn}(n) \underline{w}_n}{\underline{w}_n^H R_{ss}(n) \underline{w}_n} R_{nn}^{-1}(n) R_{ss}(n) \underline{w}_n \tag{34}$$

Figure 6:
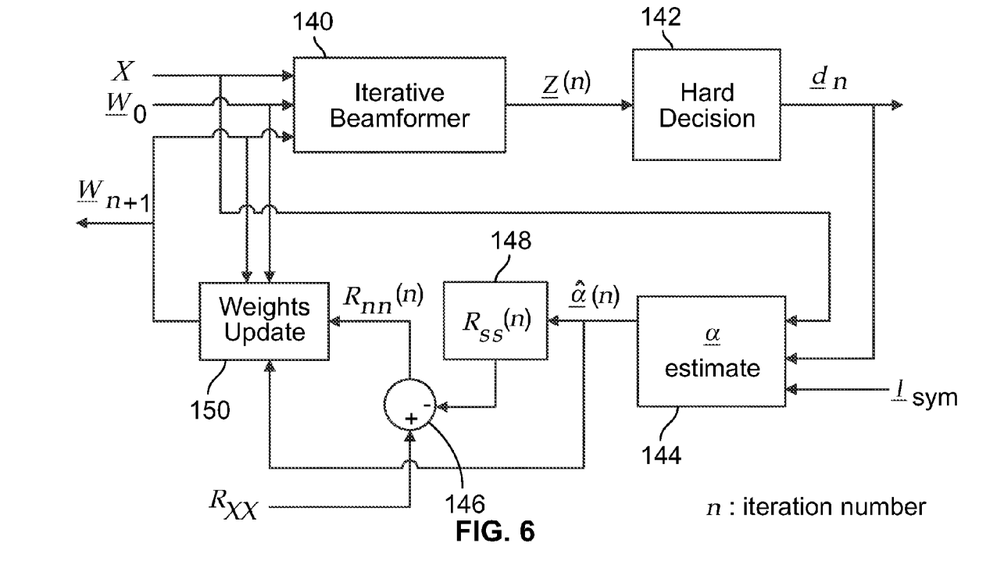
FIG. 6 is a representation of Substitution-SNR processor.

The block diagram of the method is shown in FIG. 6, where $\underline{\alpha}$ estimate and weights are updated every iteration, $\underline{I}_{sym}$ is a vector of the indicator function (16) of that comes from the SQE.

The implementation of the method includes the following steps:

Compute $R_{XX}^{-1}$, set the initial weight $\underline{w}_0 = R_{XX}^{-1} \hat{\underline{\alpha}}_{ML}$, where $R_{XX}$ is found using the dynamic noise loading in (23), and $\hat{\underline{\alpha}}_{ML}$ is from (19), ML alpha estimate.

Run m iterations per hop, and for each iteration, perform the following method:

Compute $\underline{z} = \underline{w}_n^H X$, where X is a $N_{beam} \times N$ of the received samples, $\underline{w} = \underline{w}_0$ for n=1.

Compute $$\underline{d}_{data} = \begin{cases} \text{sgn}[\text{Re}(z_k)], & k \text{ odd}, \quad k \geq N_{ref} + 1 \\ i\,\text{sgn}[\text{Im}(z_k)], & k \text{ even}, \quad k \geq N_{ref} + 1 \end{cases}.$$

Form $\underline{d} = [\underline{s}_{ref}, \underline{d}_{data}]$, where $\underline{s}_{ref}$ is a sequence of known reference symbols.

Compute $$\hat{\underline{\alpha}} = \frac{1}{I_{sym} \underline{I}^T} X(:, I_{sym}) \underline{d}(:, I_{sym})^H,$$

where $\underline{I} = [1, \ldots, 1]_{1 \times N}$.

Compute $R_{ss} = \hat{\underline{\alpha}} \hat{\underline{\alpha}}^H$.

Compute $R_{nn} = R_{XX} - R_{ss}$ and compute $$\underline{w}_{n+1} = \frac{\underline{w}_n^H R_{nn}(n) \underline{w}_n}{\underline{w}_n^H R_{ss}(n) \underline{w}_n} R_{nn}^{-1}(n) R_{ss}(n) \underline{w}_n.$$

After an end condition is met, normalize the weights by the maximum of the weights magnitude.

In a further embodiment, a gradient method is used to calculate $\underline{\alpha}$. In this embodiment, an SNR gradient is calculated using the SNR estimator equation and the weight gradient $\nabla_{\underline{w}} \cdot \text{SNR}$ is calculated such that $$\underline{w}_{n+1} = \underline{w}_n + \mu \nabla_{\underline{w}} \cdot \text{SNR} \tag{35}$$

to find the maximum SNR. Since the weights are more sensitive to alpha fluctuation, gradient on alpha would help to get the optimal weights. The alpha gradient $\nabla_{\underline{\alpha}} \cdot \text{SNR}$ is calculated such that $$\underline{\alpha}_{n+1} = \underline{\alpha}_n + \mu \nabla_{\underline{\alpha}} \cdot \text{SNR} = \underline{\alpha}_n + \mu (R_{XX}^{-1})^H \nabla_{\underline{w}} \cdot \text{SNR} \tag{36}$$

to find the maximum SNR. Generally, given an initial alpha estimate, for each trial, alpha gradient is calculated and alpha estimate is computed for around 20 iterations. A SNR estimator is used to maximize SNR given the alpha estimate for each iteration, alpha estimate is updated if necessary. At least three trials are needed to get a near-optimal performance. For the second trial and on, a randomly generated $\underline{\alpha}$ is used to initialize the alpha gradient method. At the end of all trials, the optimal weight is computed as $\underline{w}=R_{XX}^{-1}\underline{\alpha}_{best}$, where $\underline{\alpha}_{best}$ is the best alpha from all trials and iterations. Thus, the alpha gradient method requires very intensive computation as well as large iterations for convergence of the optimal weights. Hardware complexity makes it difficult to implement in hop-by-hop basis.

Figure 7A:
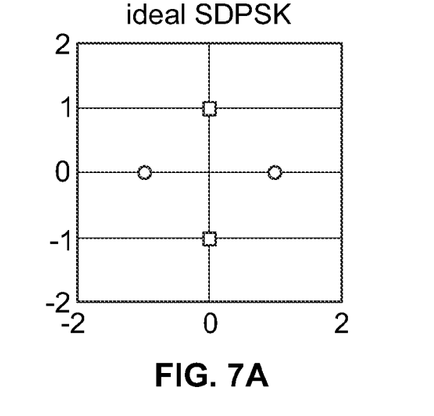
FIGS. 7A-7F depict the performance of this method and apparatus.
Figure 7B:
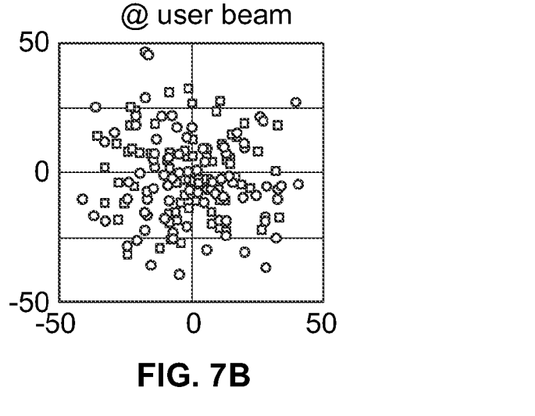
Figure 7C:
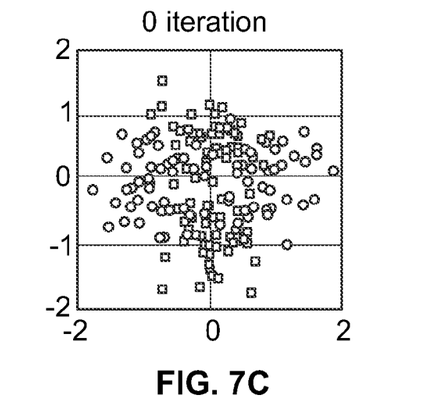

FIGS. 7A-7F depict the performance of this method and apparatus. An ideal Symmetric Differential Phase Shift Keying (SPDSK) signal constellation of symbols is shown in FIG. 7A with odd and even hops. FIG. 7B depicts user beam symbols of X that is input to the apparatus of FIG. 1. The constellations at the user beam are scattered all over due to the high jammer powers, as compared to the ideal signal constellation of FIG. 7A. In FIG. 7C, the output of initial weights 108 of FIG. 1 at the 0 iteration when the initial weight vector created using Rxx and ML alpha, is applied to the received jamming signal, without going into the Substitution OC method. The even and odd constellations represented by differently shaped dots are starting to separate as compared to FIG. 7B given that the signal-to-interference-plus-noise ratio (SINR) is low. Iterative Substitution method is needed to further clean up and separate the constellations.

Figure 7D:
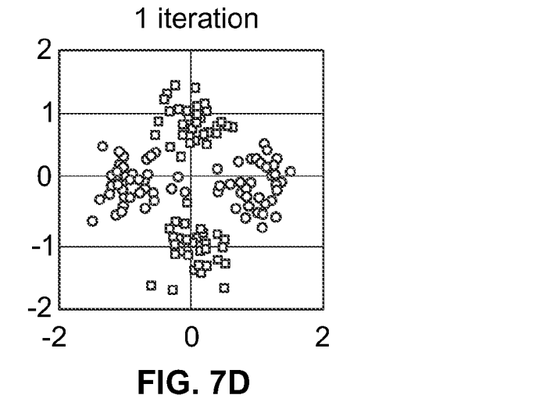
Figure 7E:
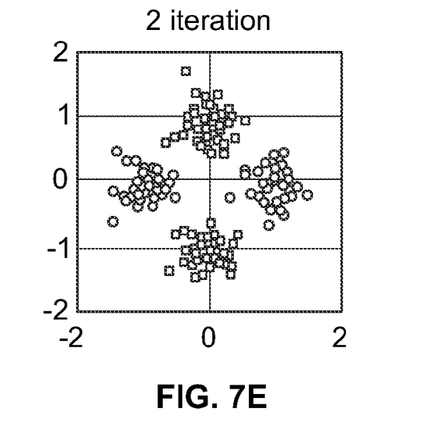
Figure 7F:
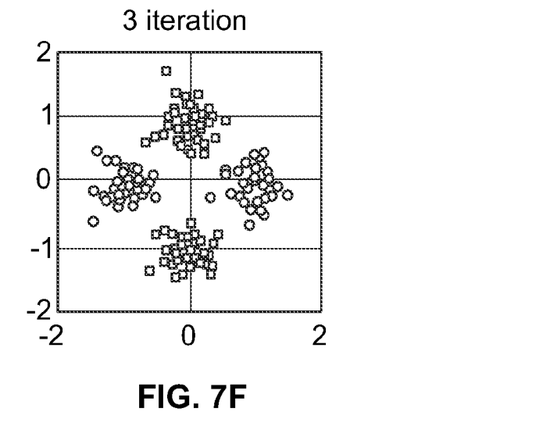

FIGS. 7D-7F show the operation of the Substitution OC method. As the number of iterations of the method increases, the constellations become cleaner. After a first iteration as shown in FIG. 7D, the constellations are separate apart compared to the 0 iteration, raising the SINR and forming a null on the jammer or maximizing the gain on the user. After the third iteration as shown in FIG. 7F, there is a reasonable SINR such that the constellations are more apparent and apart.

The apparatus in one example comprises a plurality of components such as one or more of electronic components, hardware components, and computer software components. A number of such components can be combined or divided in the apparatus. An example component of the apparatus employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for digital beamforming input signals from one or more antennas in a computer processor, comprising the steps of:
   estimating an initial steering vector based on symbols of interest derived from the input signals from the one or more antennas;
   estimating an initial covariance matrix from the input signals using dynamic noise loading to control a range of a norm of an inverse of the covariance matrix;
   generating a set of weights for the input signals from the one or more antennas from the estimated initial steering vector and the initial covariance matrix;
   iteratively estimating a new weight for each beam until an optimum weight is achieved; and
   applying the optimum weight to the input signals during digital beamforming.

2. The method of claim 1, wherein the step of estimating an initial steering vector further comprises the steps of:
   processing each input signal statistically to generate symbols representing each input signal;
   partitioning the symbols into blocks;
   determining an estimated alpha ($\alpha$) value for each block; and
   determining an estimated alpha ($\alpha$) value for each beam, wherein $\alpha$ is a steering vector.

3. The method of claim 2, further comprising the steps of:
   calculating the estimated covariance matrix according to $\hat{R}_{XX}=1/N\ XX^H$; calculating noise loading (NL) factor nl, adding identity matrix I scaled by NL factor to $\hat{R}_{XX}$, $R_{XX}=\hat{R}_{XX}+$nl I and calculating an initial weight according to $\underline{w}_0=R_{XX}^{-1}\hat{\underline{\alpha}}_{ML}$, where N is the number of symbols, X represents the input signal and ML indicates Maximum Likelihood.

4. The method of claim 1 wherein the step of iteratively estimating further comprises the steps of:
   determining $\underline{z}=\underline{w}_n^H X$, where X is a $N_{beam} \times N$ matrix of the received symbols and $w_n=w_0$ for n=1;
   determining $$d_{data} = \begin{cases} \mathrm{sgn}[\mathrm{Re}(z_k)], k \text{ odd}, k \geq N_{ref}+1 \\ i\ \mathrm{sgn}[\mathrm{Im}(z_k)], k \text{ odd}, k \geq N_{ref}+1 \end{cases};$$

and
   forming $\underline{d}=[\underline{s}_{ref}, \underline{d}_{data}]$ where $s_{ref}$ is a sequence of known reference symbols;
   where z is a demodulation result, w is a weight vector, H is a mathematical notation indicating a Hermitian matrix, N is the number of symbols, $d_{data}$ and d are decision metrics, sgn is a mathematical notation indicating the sign function, k is a variable, and $N_{ref}$ is a number of the reference symbols.

5. The method of claim 4 wherein the step of iteratively estimating further comprises additional steps of:
   determining $$\hat{\alpha} = \frac{1}{I_{sym}I^t} X(L, I_{sym})d(:, I_{sym})^H,$$

where $\underline{I}=[1,\ldots,1]_{1 \times N}$;
   determining $R_{ss}=\hat{\underline{\alpha}}\hat{\underline{\alpha}}^H$;
   determining $R_{nn}=R_{XX}-R_{ss}$; and
   determining $\underline{w}_{n+1}=R_{nn}^{-1}\hat{\underline{\alpha}}$;
   wherein $I_{sym}$ is an indicator function, $I^t$ is a transpose of the vector I, $R_{ss}$ is a signal covariance matrix and $R_{nn}$ is a noise covariance matrix.

6. The method of claim 1, wherein the configuration of the one or more antennas and a location of a signal generating terminal is not known in advance.

7. The method of claim 1, wherein the one or more antennas are elements of multi-beam antenna in a satellite.

8. A method for digital beamforming beams from a frequency hopped multi-beam antenna, said method executed in a computer processor, comprising the steps of:
   receiving an input signal from each beam of the multi-beam antenna;
   processing each input signal statistically to generate symbols representing each input signal;
   estimating an initial steering vector for each beam from the symbols of interest derived from input signal and the generated symbols;
   estimating an initial covariance matrix from the input signal using direct calculation with dynamic noise loading to control a range of a norm of an inverse of the covariance matrix;
   generating a set of weights for the beams from the one or more antennas from the estimated initial steering vector and the initial covariance matrix;
   iteratively estimating a new weight for each beam until an optimum weight is achieved; and
   normalizing the optimum weight and applying it to the received symbols during digital beamforming.

9. The method of claim 8, wherein the step of estimating an initial steering vector further comprises the steps of:
   processing each input signal statistically to generate symbols representing each input signal;
   partitioning the symbols into blocks;
   determining an estimated alpha ($\alpha$) value for each block; and
   determining an estimated alpha ($\alpha$) value for each beam, wherein $\alpha$ is a steering vector.

10. The method of claim 9, further comprising the steps of:
   calculating the estimated covariance matrix according to $\hat{R}_{XX}=1/N\ XX^H$; calculating noise loading (NL) factor nl, adding identity matrix I scaled by the NL factor to $\hat{R}_{XX}$, $R_{XX}=\hat{R}_{XX}+\text{nl}\ I$ and calculating an initial weight according to $\underline{w}_0=R_{XX}^{-1}\hat{\underline{\alpha}}_{ML}$, where N is the number of symbols, X represents the input signal and ML indicates Maximum Likelihood.

11. The method of claim 8 wherein the step of iteratively estimating further comprises the steps of:
   determining $\underline{z}=\underline{w}_n^H X$, where X is a $N_{beam} \times N$ matrix of the received symbols and $w_n=w_0$ for n=1;
   determining $$d_{data} = \begin{cases} \text{sgn}[\text{Re}(z_k)], k \text{ odd}, k \geq N_{ref} + 1 \\ i\ \text{sgn}[\text{Im}(z_k)], k \text{ odd}, k \geq N_{ref} + 1 \end{cases};$$

and
   forming $\underline{d}=[\underline{s}_{ref}, \underline{d}_{data}]$ where $s_{ref}$ is a sequence of known reference symbols;
   where z is a demodulation result, w is a weight vector, H is a mathematical notation indicating a Hermitian matrix, N is the number of symbols, $d_{data}$ and d are decision metrics, sgn is a mathematical notation indicating the sign function, k is a variable, and $N_{ref}$ is a number of the reference symbols.

12. The method of claim 11 wherein the step of iteratively estimating further comprises additional steps of:
   determining $$\hat{\alpha} = \frac{1}{I_{sym}I^t} X(L, I_{sym}) d(:, I_{sym})^H,$$

where $\underline{I}=[1, \ldots, 1]_{1 \times N}$;
   determining $R_{ss}=\hat{\underline{\alpha}}\hat{\underline{\alpha}}^H$;
   determining $R_{nn}=R_{XX}-R_{ss}$; and
   determining $\underline{w}_{n+1}=R_{nn}^{-1}\underline{\alpha}$,
   where $I_{sym}$ is an indicator function, $I^t$ is a transpose of the vector I, $R_{ss}$ is a signal covariance matrix and $R_{nn}$ is a noise covariance matrix.

13. The method of claim 8, wherein the configuration of the one or more antennas and a location of a signal generating terminal is not known in advance.

14. The method of claim 8, wherein the one or more antennas are elements of multi-beam antenna in a satellite.

15. A computer processor apparatus configured to perform a method for digital beamforming input signals from one or more elements of multi-beam antenna, comprising the steps of:
   estimating an initial steering vector based on symbols of interest derived from the input signals from the one or more antennas;
   estimating an initial covariance matrix from the input signals using dynamic noise loading to control a range of a norm of an inverse of the covariance matrix;
   generating a set of weights for the input signals from the one or more antennas from the estimated initial steering vector and the initial covariance matrix;
   iteratively estimating a new weight for each beam until an optimum weight is achieved; and
   applying the optimum weight to the input signals during digital beamforming.

16. The computer processor of claim 15, further configured to perform the steps of:
   processing each input signal statistically to generate symbols representing each input signal;
   partitioning the symbols into blocks;
   determining an estimated alpha ($\alpha$) value for each block; and
   determining an estimated alpha ($\alpha$) value for each beam, wherein $\alpha$ is a steering vector.

17. The computer processor of claim 16, further configured to execute the steps of:
   calculating the estimated covariance matrix according to $\hat{R}_{XX}=1/N\ XX^H$; calculating noise loading (NL) factor nl, adding identity matrix I scaled by the NL factor to $\hat{R}_{XX}$, $R_{XX}=\hat{R}_{XX}+\text{nl}\ I$ and
   calculating an initial weight according to $\underline{w}_0=R_{XX}^{-1}\hat{\underline{\alpha}}_{ML}$, where N is the number of symbols, X represents the input signal and ML indicates Maximum Likelihood.

18. The computer processor of claim 15 wherein the step of iteratively estimating further comprises the steps of:
   determining $\underline{z}=\underline{w}_n^H X$, where X is a $N_{beam} \times N$ matrix of the received symbols and $w_n=w_o$ for n=1;
   determining $$d_{data} = \begin{cases} \text{sgn}[\text{Re}(z_k)], k \text{ odd}, k \geq N_{ref} + 1 \\ i\ \text{sgn}[\text{Im}(z_k)], k \text{ odd}, k \geq N_{ref} + 1 \end{cases};$$

forming $\underline{d}=[\underline{s}_{ref}, \underline{d}_{data}]$ where $s_{ref}$ is a sequence of known reference symbols;
   determining $$\hat{\alpha} = \frac{1}{I_{sym}I^t} X(L, I_{sym}) d(:, I_{sym})^H,$$

where $\underline{I}=[1,\ldots,1]_{1\times N}$;
determining $R_{ss}=\underline{\hat{\alpha}}\underline{\hat{\alpha}}^H$;
determining $R_{nn}=R_{XX}-R_{ss}$; and
determining $\underline{w}_{n+1}=R_{nn}^{-1}\underline{\hat{\alpha}}$;
where z is a demodulation result, w is a weight vector, H is a mathematical notation indicating a Hermitian matrix, N is the number of symbols, $d_{data}$ and d are decision metrics, sgn is a mathematical notation indicating the sign function, k is a variable, $N_{ref}$ is a number of the reference symbols $I_{sym}$ is an indicator function, $I^t$ is a transpose of the vector I, $R_{ss}$ is a signal covariance matrix and $R_{nn}$ is a noise covariance matrix.

19. The computer processor of claim 15, wherein the configuration of the one or more elements of multi-beam antenna and a location of a signal generating terminal is not known in advance.

20. The computer processor of claim 15, wherein the one or more antennas are elements of multi-beam antenna in a satellite.

21. A multi-beam antenna system for performing digital beamforming of input signals from one or more antenna elements, the digital beamforming comprising the steps of:
estimating an initial steering vector based on symbols of interest derived from the input signals from the one or more antenna elements;
estimating an initial covariance matrix from the input signals using dynamic noise loading to control a range of a norm of an inverse of the covariance matrix;
generating a set of weights for the input signals from the one or more antenna elements from the estimated initial steering vector and the initial covariance matrix;
iteratively estimating a new weight for each beam until an optimum weight is achieved; and
applying the optimum weight to the input signals during digital beamforming.

22. The multi-beam antenna system of claim 21, further configured to perform the steps of:
processing each input signal statistically to generate symbols representing each input signal;
partitioning the symbols into blocks;
determining an estimated alpha ($\alpha$) value for each block; and
wherein the step of estimating an initial steering vector, wherein $\alpha$ is a steering vector.

23. The multi-beam antenna system of claim 22, further configured to execute the steps of:

calculating the estimated covariance matrix according to $\hat{R}_{XX}=1/N\ XX^H$; calculating noise loading (NL) factor nl, adding identity matrix I scaled by the NL factor to $\hat{R}_{XX}$, $$R_{XX}=\hat{R}_{XX}+\text{nl } I$$

and
calculating an initial weight according to $w_0=R_{XX}^{-1}\hat{\underline{\alpha}}_{ML}$, where N is the number of symbols, X represents the input signal and ML indicates Maximum Likelihood.

24. The multi-beam antenna system of claim 21 wherein the step of iteratively estimating further comprises the steps of:
determining $\underline{z}=\underline{w}_n^H X$, where X is a $N_{beam}\times N$ matrix of the received symbols and $w_n=w_0$ for n=1;
determining $$d_{data}=\begin{cases} \text{sgn}[\text{Re}(z_k)], k \text{ odd}, k\geq N_{ref}+1 \\ i\ \text{sgn}[\text{Im}(z_k)], k \text{ odd}, k\geq N_{ref}+1 \end{cases};$$

forming $\underline{d}=[\underline{s}_{ref},\underline{d}_{data}]$ where $s_{ref}$ is a sequence of known reference symbols;
determining $$\hat{\underline{\alpha}}=\frac{1}{I_{sym}I^t}X(L,I_{sym})\underline{d}(:,I_{sym})^H,$$

where $\underline{I}=[1,\ldots,1]_{1\times N}$;
determining $R_{ss}=\underline{\hat{\alpha}}\underline{\hat{\alpha}}^H$;
determining $R_{nn}=R_{XX}-R_{ss}$; and
determining $\underline{w}_{n+1}=R_{nn}^{-1}\underline{\hat{\alpha}}$;
where z is a demodulation result, w is a weight vector, H is a mathematical notation indicating a Hermitian matrix, N is the number of symbols, $d_{data}$ and d are decision metrics, sgn is a mathematical notation indicating the sign function, k is a variable, $N_{ref}$ is a number of the reference symbols, $I_{sym}$ is an indicator function, $I^t$ is a transpose of the vector I, $R_{ss}$ is a signal covariance matrix and $R_{nn}$ is a noise covariance matrix.

25. The multi-beam antenna system of claim 21, wherein a location of a signal generating terminal is not known in advance.

* * * * *